United States Patent Office 2,776,393
Patented Jan. 1, 1957

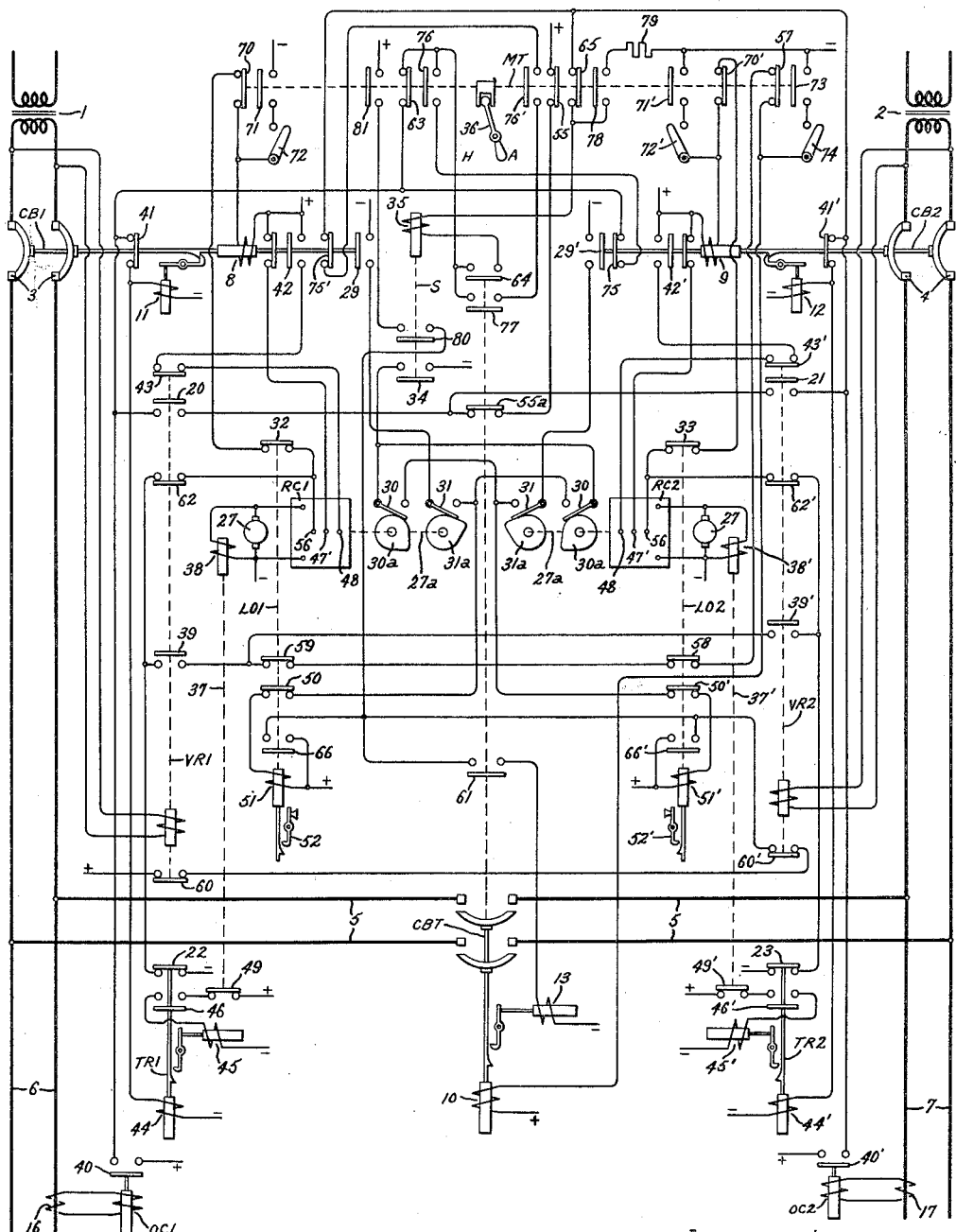

2,776,393

ELECTRIC CURRENT DISTRIBUTION SYSTEM

Jack H. Easley, Scotia, N. Y., and Eugene M. Smith, Drexel Hill, Pa., assignors to General Electric Company, a corporation of New York Application June 30, 1955, Serial No. 519,028

14 Claims. (Cl. 317—25)

Our invention relates to electric current distribution systems and apparatus, and more particularly to automatic means for controlling a normally open circuit breaker connected to tie together the load terminals of a pair of line circuit breakers in individual distribution circuits, as for example a pair of distribution circuits connected in parallel to a single source of electric current supply.

In electric distribution systems it is common practice, to ensure continuity of service, to interconnect through a normally open tie circuit breaker the load side terminals of a pair of line circuit breakers connected in individual load circuits. By this arrangement if either of the line circuit breakers is opened for any reason, such as due to undervoltage on its associated supply line, or to permit the supply transformer for that line to be taken out of service, the tie circuit breaker can be closed thereby to permit both load circuits to be fed in common through the single line circuit breaker remaining closed. Ordinarily, such interconnected line circuit breakers are each additionally provided with an automatic reclosing relay, such for example as that described and claimed in Patent 2,202,722—Anderson. These reclosing relays operate in response to overload tripping of the associated line circuit breaker to initiate a predetermined series of recurrent line circuit breaker reclosures if the fault causing tripping persists. If the fault is not persistent so that the line circuit breaker stays closed upon one of its reclosures in the series, the reclosing relay resets to its initial position. If a fault is persistent, the associated line circuit breaker is locked out at the end of the reclosing cycle and must be reclosed manually. Means are also provided so that if either of the line circuit breakers is opened for any reason, the tie circuit breaker will be automatically closed and the overload responsive devices associated with both load circuits each effective to trip the then-common line circuit breaker remaining closed and thereby initiate operation of its associated reclosing relay.

In the foregoing arrangement, when the tie circuit breaker is closed and one of the line circuit breakers open, the common line circuit breaker through which both loads are supplied is tripped by a fault on either load circuit and locked out if the fault persists. Thus both load circuits are locked out in the event of persistent fault on either circuit. It is evident, however, that if the fault were on the load circuit fed through the tie circuit breaker, it is unnecessary to lock out the load circuit fed directly through the then-common line circuit breaker. Moreover, while the common line circuit breaker must be locked out if a persistent fault occurs on its own load circuit, the other load circuit could be returned to service automatically when its own line is re-energized if the tie circuit breaker is opened along with lockout of the common line circuit breaker resulting from a persistent fault on its own load circuit.

In such systems, means are also commonly provided for disabling the automatic reclosing relays, so that the line and tie circuit breakers can be closed only manually. In such operation, both load circuits would be locked out in response to a fault on either circuit if both overload means are connected, as in automatic operation, to trip the common line circuit breaker when the tie circuit breaker is closed. While this arrangement has been common heretofore, it is, in fact, unnecessary to trip the line circuit breaker if the fault is on the load circuit fed through the tie circuit breaker.

Accordingly, therefore, it is a principal object of our invention to provide, in such an interconnected electric current distribution system, selective lockout means for opening the tie circuit breaker in response to a persistent fault fed through the tie circuit breaker without effecting lockout of the then-common line circuit breaker.

It is another object of our invention to provide for automatic restoration to service through its own line circuit breaker of an unfaulted circuit previously fed through a tie circuit breaker and locked out due to a fault on the interconnected supply circuit.

Still another object of our invention is to provide, in a pair of interconnected supply circuits having a tie circuit breaker therebetween, means for selectively locking out the tie breaker in response to a fault on the load circuit fed through it without providing separate overload and reclosing relay equipment for the tie breaker.

It is a more particular object of our invention to provide, in a pair of interconnected electric supply circuits having individual line circuit breakers and a tie circuit breaker therebetween, means operable when the tie circuit breaker is closed and in response to a fault on the supply circuit fed therethrough to open the tie breaker prior to at least the last in a complete series of recurrent reclosures of whichever line circuit breaker is then feeding both load circuits.

It is a further specific object of our invention to provide, in such an interconnected electric distribution system, means operable upon lockout of either line circuit breaker when feeding both supply circuits to open also the tie circuit breaker.

Still another object of our invention is to provide for manual operation of such an interconnected pair of distribution circuits wherein when either line circuit is feeding both load circuits in common, a fault on the circuit fed through the tie circuit breaker will trip only that breaker.

In carrying out our invention in one preferred embodiment we provide, for each of a pair of line circuit breakers having their load terminals interconnected through a tie normally open circuit breaker, both undervoltage and overcurrent tripping means. Transfer means operable by either undervoltage tripping means is arranged to close the tie circuit breaker if either line circuit breaker is opened due to undervoltage at its line side. Each line circuit breaker is provided also with a reclosing relay actuated by overload opening of its associated line circuit breaker to initiate a predetermined series of recurrent reclosures thereof terminating in lockout of the associated line circuit breaker if the fault persists. Whenever the tie circuit breaker is closed and the reclosing relays are operable, the overload responsive means of both load circuits are individually effective to trip the then-common line circuit breaker remaining in service and thereby initiate operation of its reclosing relay.

Each reclosing relay is provided with timing means effective prior to at least the last reclosure in any complete series of reclosures to open the tie circuit breaker at that time if the fault is on the load circuit being fed through the tie circuit breaker. For this purpose we provide a selector relay which is actuated only in response to each operation of the overload responsive means on that load circuit being fed through the tie circuit breaker. The line circuit breaker associated directly with the load circuit being fed through the tie breaker is locked out simultaneously with opening of the tie circuit breaker, thereby completely to isolate a fault on a load circuit being fed through the tie circuit breaker. This prevents an attempted restoration to service of a faulted load circuit through its own line circuit breaker when the load circuit was interrupted by the tie circuit breaker while its own line circuit breaker was out of service.

Manual transfer means are also provided for disabling the reclosing relays and rendering the undervoltage relays ineffective, thereby to provide for "hand" operation of the system. In this "hand" position, the selector relay is connected to trip only the tie circuit breaker in response to the overload relay on either load being fed through the tie circuit breaker. The overload relay on any load circuit fed directly through its own line circuit breaker trips that line circuit breaker only.

Our invention will be more fully understood and its various objects and advantages further appreciated by referring now to the following detailed specification taken in conjunction with the accompanying drawing, the single figure of which is a schematic circuit diagram of an electric current distribution system embodying our invention.

General description

Referring now to the drawing, I have shown a system of electric current distribution comprising a pair of electric current supply transformers 1 and 2 each having a primary winding adapted to be connected to a source or sources of electric current supply, as for example, to be connected in parallel circuit relation to a common source of electric current supply (not shown). The secondary windings of the supply transformers 1 and 2 are connected respectively to individual load circuits through line circuit breakers CB1 and CB2 respectively. The load side terminals, or load terminals, of the circuit breakers CB1 and CB2, identified respectively as 3 and 4, are interconnected by tie conductors 5 through a normally open circuit breaker CBT. It will be understood that the load circuits connected directly to the line circuit breaker load terminals 3 and 4, identified respectively by the numerals 6 and 7, supply current to separate electric load devices through their respective line circuit breakers, normally each independently of the other.

The circuit breakers CB1, CB2 and CBT are all of the biased open, latched closed type, and are provided respectively, with closing coils 8, 9 and 10 and with tripping coils 11, 12 and 13. Each line circuit breaker CB1 and CB2 is additionally provided with an overload responsive device, these devices being shown as overcurrent relays OC1 and OC2 respectively, having energizing windings supplied from load circuit current transformers 16 and 17, respectively. Means are also provided for opening the line circuit breakers CB1 and CB2 in response to undervoltage at the secondary sides of their respective supply transformers 1 and 2. These undervoltage responsive means are shown as normally energized voltage relays VR1 and VR2, for the circuit breakers CB1 and CB2 respectively. The voltage relays VR1 and VR2 are provided, respectively, with contacts 20 and 21 closed upon deenergization of the relays to energize the trip coils 11 and 12, respectively, and are provided also with a number of other contacts the purposes of which will be more fully explained hereinafter.

The line circuit breakers CB1 and CB2 are each adapted when open to initiate operation of individual reclosing relays RC1 and RC2. These reclosing relays have been shown partially diagrammatically, and may, for example, be of the type illustrated in Patent 2,202,722 to Anderson. As described in the Anderson patent, each reclosing relay is a cycle timing device having a timing motor 27 driving a timing shaft 27a provided with a plurality of contact controlling cams such as shown in the patent. The contact controlling cams shown in the Anderson patent, and the reclosing relay there shown, have been indicated in block form in the present drawing, circuit correspondence being indicated by showing the three external terminals of each reclosing relay by means of the same reference numerals 56, 47' and 48 used in the Anderson patent.

For use in connection with the present selective lockout arrangement, each reclosing relay RC1 and RC2 is additionally provided with a pair of cam switches 30 and 31 controlled, respectively, by cams 30a and 31a on the timing shafts 27a. The cams 30a are adapted to close the switches 30 momentarily at an instant prior to the last circuit breaker reclosure in any complete series of reclosures controlled by that reclosing relay. The cams 31a are adapted to close the switches 31 in the lockout positions of the timing shafts 27a, which lockout positions are described in the Anderson patent. It will be understood that lockout occurs after the last reclosure in a complete series of reclosures, so that the switches 30 are adapted to be closed prior to the last reclosure and switches 31 are adapted to be closed after the last reclosure.

There is provided in conjunction with each reclosing relay RC1 and RC2 a lockout relay, identified, respectively, as LO1 and LO2. These lockout relays are energized by their respective reclosing relays in the lockout positions in the reclosing relays, and through their respective normally closed contacts 32 and 33 they interrupt the automatic closing circuits for the line circuit breaker closing coils 8 and 9, respectively. The lockout relays LO1 and LO2 are each provided also with a plurality of interlock contacts the purposes of which will be more fully explained hereinafter.

In order to provide reclosing power for the line circuit breakers CB1 and CB2 upon return of voltage to their respective supply lines after having been tripped due to undervoltage (i. e. in the absence of reclosing relay operation), there is associated with each line circuit breaker a transfer relay, identified respectively as TR1 and TR2. These relays are provided, respectively, with normally closed contacts 22 and 23 connected to supply power to the circuit breaker closing coils 8 and 9, respectively, whenever the associated voltage relay VR1 or VR2 is energized. In addition the transfer relays TR1 and TR2 are controlled by the associated overcurrent relays OC1 and OC2, respectively, in a manner to maintain the contacts 22 or 23 open whenever the associated reclosing relay is in cyclic operation, as will be further described below.

It is desirable selectably to lock out and preclude subsequent automatic reclosure of whichever of the line circuit breakers CB1 or CB2 which has been out of service after the tie circuit breaker CBT has been opened because of a persistent overload on the load circuit associated with the line circuit breaker out of service. For this purpose, we provide a selector relay S having a normally open contact 34 connected to control a selected one of the lockout relays LO1 or LO2 through one or the other of the recloser relay contacts 30. As will appear more fully hereinafter, the selector relay S is provided with an energizing winding 35 connected selectively in series circuit relation with one or the other of the line circuit breaker trip coils 11 or 12, so that the selector relay is energized in response to each actuation of that overcurrent relay OC1 or OC2 associated with any load circuit being fed through the tie circuit breaker CBT, the selector relay being energized only when the tie circuit breaker is closed.

Finally, we provide a manual transfer switch MT having two switching positions one for "hand" operation of the system, and the other for "automatic" operation thereof, these positions being identified in connection with the transfer switch handle 36 as "H" and "A." The manual transfer switch is provided with a plurality of contacts which, in the hand or the H position of the switch so connects the system that the circuit breakers CB1, CB2 and CBT are solely manually operable to closed circuit positions, the reclosing relays being disabled and the undervoltage relays rendered ineffective, but may be tripped due to overcurrent in a manner to be described hereinafter. In the automatic or A position of the transfer switch MT, the automatic transfer, automatic reclosing and selective lockout features to be more fully described hereinafter are operative.

*Automatic operation*

With the manual transfer switch MT in the automatic position shown, the operation of our system is as follows:

Assuming first that the line circuit breakers CB1 and CB2 are closed and the tie circuit breaker CBT open, with normal voltage on the secondary windings of each of the supply transformers 1 and 2, the system will be in normal operation with the load circuits 6 and 7 fed directly and individually through the line circuit breakers CB1 and CB2, respectively. The voltage relays VR1 and VR2 will be picked up, as shown in the drawing, and all the other relays dropped out as shown, the timing shafts 27a of the reclosing relays RC1 and RC2 being in their initial rest positions, as indicated on the drawing. If now an overload appears on one of the load circuits, as for example the load circuit 6, the overcurrent relay OC1 is energized, thereby to close its normally open contact 40 and complete an energizing circuit for the circuit breaker trip coil 11 through a normally open interlock contact 41 of the line circuit breaker CB1, and contact 41 being closed in the closed circuit position of this circuit breaker. The circuit breaker CB1 is thereupon tripped, moving to its open circuit position and closing another of its interlock contacts 42 to energize its associated reclosing relay RC1 and initiate a cycle of reclosing operation. Through the interlock contact 42 an energizing circuit is completed for the timing motor 27 of the reclosing relay RC1, which circuit includes the contact 42, a normally closed contact 43 of the voltage relay VR1 and the terminal 48 of the reclosing relay RC1. From the Anderson Patent 2,202,722 above referred to, it will be evident that power supplied to the terminal 48 initiates operation of the reclosing relay.

When the foregoing overcurrent tripping operation occurred, the overcurrent relay OC1, in addition to energizing the tripping coil 11, completed an energizing circuit also for a closing coil 44 of the transfer relay TR1. The transfer relay TR1 is of the latched-closed type, so that upon picking up, it latches in its closed position until again released by a tripping coil 45. In picking up, the relay TR1 closes a normally open contact 46 to complete an energizing circuit for its trip coil 45. However, completion of this circuit is prevented in the operation now being described by reason of a voltage relay 37 having its actuating winding 38 connected across the terminals of the reclosing relay (RC1) timing motor 27. As soon as the reclosing relay RC1 is energized, the voltage relay 37 picks up, opening its normally closed contact 49 and interrupting the tripping circuit for the transfer relay trip coil 45. The transfer relay TR1, which has a slight hesitancy in dropout, therefore remains latched up, and thus maintains its contact 22 open, so that no energizing circuit for the line circuit breaker closing coil 8 (CB1) can be completed through the transfer relay contact 22.

The reclosing relay RC1, thus having initiated a cycle of reclosing operation, recurrently completes an energizing circuit for the closing coil 8 of the circuit breaker CB1. This circuit may be followed from positive control power (+) through the closing coil 8, a contact 70 on the manual transfer switch MT closed in the "automatic" position of the switch, the normally closed contact 32 of the lockout relay LO1, and the reclosing relay terminal 56. As will be evident from the Anderson patent above referred to, if the circuit breaker CB1 remains closed without further overcurrent tripping after the first or second reclosure, the reclosing relay RC1 continues in operation to its initial position and then comes to rest. In such resetting operation, the cam switch 31 of the relay RC1 will be closed as the timing shaft 27a passes through the lockout position. This closure, however, will not energize the lockout relay LO1 because a normally closed interlock switch 29 on the circuit breaker CB1 is open at that time. If desired, of course, a reversible resetting type of reclosing relay, such as shown in Patent 2,582,027—Goff, may be used, in which case the interlock switch 29 is not needed.

If, however, the fault on the load circuit 6 persists, so that the reclosing relay RC1 goes through its complete cycle of reclosing operation, for example 3 reclosing impulses, the timing shaft 27a comes to rest in its lockout position. In this position, the cam contact 31 of relay RC1 is closed, thereby completing an energizing circuit for the lockout relay LO1, which circuit can be followed from positive control power (+) through an energizing winding 51 of the lockout relay LO1, a normally closed interlock contact 50 on the relay, the cam contact 31 of the reclosing relay RC1, and the interlock switch 29 to negative power (—). When the relay LO1 picks up, it is latched in its picked up position by means of a latch 52. In this position, lockout relay contact 32 is open, thereby to preclude further energization of the circuit breaker closing coil 8 through the reclosing relay RC1.

It will be evident that overload tripping operation of the line circuit breaker CB2 when the tie circuit breaker CBT is open takes place in a manner entirely analagous to that described immediately above with respect to the circuit breaker CB1, the operative control elements of course being the reclosing relay RC2, the overcurrent relay OC2, the voltage relay VR2, the lockout relay LO2 and the transfer relay TR2, the various parts of which not heretofore specifically referred to and corresponding to like parts of the devices RC1, OC1, VR1, LO1 and TR1 have been identified by the same reference numerals with prime markings.

Let it now be again assumed that the system is in normal operation with the line circuit breakers CB1 and CB2 closed and the tie circuit breaker CBT open, but that a condition of undervoltage occurs at the secondary side of the supply transformer 1, thereby to drop out the voltage relay VR1. Under this condition, automatic transfer of the load circuit 6 from the supply transformer 1 to the supply transformer 2 takes place by opening of the circuit breaker CB1 and closing of the tie breaker CBT in the following manner.

When the voltage relay VR1 drops out, it opens its contact 43 to interrupt the energizing circuit to the reclosing relay RC1, so that even though the circuit breaker CB1 is tripped and closed, its interlock contact 42, the reclosing relay RC1 is not set in operation. The voltage relay VR1 in dropping out also closes its contact 20, thereby to complete an energizing circuit for the trip coil 11 of the line circuit breaker CB1, which circuit may be followed from a source of positive control power (+) through a contact 55 closed in the automatic position of the manual transfer switch MT, a normally closed contact 55a on the tie circuit breaker CBT, the contact 20 of the voltage relay VR1, the normally closed interlock contact 41 of the circuit breaker CB1 and the trip coil 11. The circuit breaker CB1 is thus tripped and moved to its open circuit position. While thus tripping the line circuit breaker CB1 the voltage relay VR1 also acts to close the tie circuit breaker CBT. To close the tie circuit breaker, the voltage relay VR1 closes a contact 39 which contact completes an energizing circuit for the tie circuit breaker closing coil 10 from a source of positive control power (+) through the closing coil 10, a contact 57 of the manual transfer switch MT closed in the "automatic" position of the switch, a normally closed contact 58 on the lockout relay LO2, a normally closed contact 59 on the lockout relay LO1, the contact 39 of voltage relay VR1 and the contact 22 of the transfer relay TR1. The tie circuit breaker CB2 therefore picks up and is latched in closed circuit position.

In connection with energization of the tie circuit breaker closing coil 10, it may be noted that when the voltage VR1 drops out and completed, through its contact 20, an energizing circuit for the line circuit breaker trip coil 11, the contact 20 completed also a parallel energizing circuit for the closing coil 44 of the transfer relay TR1. The relay TR1 therefore picked up and latched in. However, in so doing, it closed its contact 46 thereby completing an energizing circuit for its own trip coil 45, so that the relay TR1 immediately dropped out to reclose its contact 22. In this case of undervoltage tripping of the circuit breaker CB1 it will be recalled that the voltage relay VR1 disables the reclosing relay RC1 at the contact 43, so that the voltage relay 37 connected across the reclosing relay motor 27 is not energized and therefore does not open the contact 49 in the trip circuit of the transfer relay TR1.

If now voltage should return to the secondary terminals of the supply transformer 1, the voltage relay VR1 is again picked up and the load circuit 6 is retransferred to its own supply transformer 1 by opening of the tie breaker CBT and closing of the line circuit breaker CB1. This operation is effected as follows. When the voltage relay VR1 again picks up, it closes a contact 60 to complete an energizing circuit for the tripping coil 13 of the tie circuit breaker CBT. This tripping circuit breaker may be followed from a source of positive control power (+) through the contact 60, a similar contact 60' on the voltage relay VR2, a normally open interlock contact 61 on the tie circuit breaker CBT, and the tripping coil 13 to the negative (—) side of control power. Reenergization of the voltage relay VR1 also closes another of its contacts 62, thereby to complete an energizing circuit for the closing coil 3 of the line circuit breaker CB1. This closing coil circuit may be followed from positive control power (+) through the closing coil 8, the contact 70 of manual transfer switch MT, the contact 32 on the lockout relay LO1, the contact 62 of the voltage relay VR1 and the contact 22 of the transfer relay TR1 to a negative control power (—).

Let it now be assumed that loss of voltage at the secondary of the supply transformer 1 has effected transfer of the load circuit from the transformer 1 to the transformer 2 as previously described, with the line circuit breaker CB1 being open and the tie circuit breaker CBT closed, and that while the load circuit 6 is being fed through the tie circuit breaker, an overload occurs on the circuit 6.

The line circuit breaker CB1 being open, its trip coil 11 cannot be energized because its interlock contact 41 is open. When the overcurrent relay OC1 picks up, however, it completes an energizing circuit for the trip coil 12 of the now-common line circuit breaker CB2 in series with the actuating coil 35 of the selector relay S. This energizing circuit may be followed from positive control power (+) through the contact 40 of the overcurrent relay OC1, a contact 63 of the manual transfer switch MT, a contact 64 of the tie circuit breaker CBT, the coil 35 of the selector relay S, a contact 65 of the manual transfer switch MT, the interlock contact 41' of the line circuit breaker CB2, and the trip coil 12 to negative control power (—). At the same time an energizing circuit is completed for the closing coil 44' of the transfer relay TR2 in parallel with the circuit breaker trip coil 12, and the selector relay S is picked up by its series coil 35. The transfer relay TR2 latches closed and is not tripped out by its trip coil 45' because the tripping circuit of this relay is disabled by the contact 49' of the voltage relay 38' associated with the reclosing relay RC2. As previously described in connection with overcurrent operation, opening of the line circuit breaker, in this case the breaker CB2 initiates timing operation of its associated reclosing relay, and by applying voltage to the timing motor of the reclosing relay the associated voltage relay 37' is energized. It will be evident that when the circuit breaker CB2 opens, the reclosing relay RC2 is energized by closure of the circuit breaker interlock contact 42'.

If the overload on the supply circuit 6 is of a transient nature, so that the line circuit breaker CB2 remains closed after its first or second reclosure by the relay RC2, the reclosing relay continues in operation to its initial position without producing further reclosures and comes to rest in this position. In this resetting operation, the lockout relay LO2 is not picked up as the cam switch 31 of relay RC2 is closed in passing through the lockout position, because the interlock switch 29' in the circuit breaker CB2 is open at this time. Upon reset of the relay RC2, its motor 27 is deenergized and the relay 37' drops out, completing at its contact 49' a trip circuit for the transfer relay TR2 and thus restoring all control elements to their position prior to the overload.

If, however, the overload on the load circuit 6 persists, so that the line circuit breaker CB2 continues to be tripped out immediately after each reclosure, then selective lockout of the tie circuit breaker CBT is accomplished in the following manner.

It will be recalled that, as previously described, when a fault occurs in the manner now assumed on the load circuit 6, now being fed through the tie circuit breaker, the selector relay S is picked up upon each actuation of the overcurrent relay, in this case the relay OC1. For the sake of illustration, let it be assumed the reclosing relay RC2 effects three reclosing operations prior to lockout, as described in the Anderson patent above referred to. As previously described, the cam switch 30 of the reclosing relay RC2 is set to close prior to the last reclosing operation in any complete series of reclosures. Thus the switch 30 closes prior to the third reclosure of the line circuit breaker CB2. When the switch 30 closes, it prepares a circuit such that a subsequent energization of the overcurrent relay OC1 (and consequent pickup of the selector relay S) effects tripping of the tie circuit breaker CBT and lockout of the then-open line circuit breaker CB1.

The foregoing operation is effected by the selector relay S after the second reclosure of the circuit breaker CB2 as follows. When the overcurrent relay OC1 is picked up after the second circuit breaker reclosure, the selector relay S is energized simultaneously with the trip coil 12 of the circuit breaker CB2. The circuit breaker CB2 is thus tripped for the third time, and simultaneously the selector relay S completes, through its contact 34 and through the now-closed reclosing relay contact 30 (RC2) an energizing circuit for the lockout relay LO1. This circuit may be followed from positive control power (+) through the actuating winding 51 of the lockout relay LO1, the lockout relay interlock contact 50, the cam contact 30 of the reclosing relay RC2, and the contact 34 of the selector relay S to negative control power (—). As previously described, the lockout relay LO1 latches closed and can be released only manually. When the lockout relay LO1 picks up, it completes through its contact 66 an energizing circuit for the trip coil 13 of the tie circuit breaker CBT. This circuit may be followed from positive control power (+) through the lockout relay contact 66, the interlock contact 61 of the tie circuit breaker CBT, and the trip coil 13 to negative control power (—).

Thus, prior to the last reclosing operation of the relay RC2 the tie circuit breaker CBT is tripped simultaneously with the line circuit breaker CB2 and the lockout relay LO1 is latched up. By reason of this operation, the last reclosure of the line circuit breaker CB2 will be successful and that circuit breaker will remain closed because the faulted load circuit has been removed through opening of the tie circuit breaker CBT. At the same time, the line circuit breaker CB1 has been locked out by disabling its closing coil circuit at the contact 32, so that in the event that voltage returns to the secondary of the supply transformer 1, the circuit breaker CB1 will not be automatically closed upon the faulted load circuit 6.

It will now be appreciated that if, under the conditions of operation assumed above (that is, the tie circuit breaker CBT closed to supply the circuit 6), a persistent overload had occurred on the load circuit 7, it is necessary that the line circuit breaker CB2 be locked out. While this lockout necessarily interrupts service to both load circuits 6 and 7, provision is made for simultaneously opening the tie circuit breaker CBT so that when voltage reappears at the secondary of the supply transformer 1 the line circuit breaker CB1 can be automatically reclosed to supply power to its unfaulted load circuit 6. These actions will be evident from the foregoing description of operation with the load circuit 6 faulted from the following consideration.

When the fault appears upon the load circuit 7, the overcurrent relay OC2 is energized and completes a trip circuit for the circuit breaker CB2 through its trip coil 12, which trip circuit does not include the coil 35 of the selector relay S. The selector relay S is therefore not energized upon each fault, as in the case when the fault appears on the load circuit fed through the tie circuit breaker. Thus, even though the reclosing relay contact 30 (RC2) is closed after the second reclosure of the line circuit breaker CB2, no trip circuit for the tie circuit breaker CBT is completed at this time, because the selector relay S is not energized upon subsequent operation of the overcurrent relay OC2. Thus, if the fault is a persistent one, the reclosing relay RC2 proceeds to its lockout position, closing its contact 31 and completing an energizing circuit for the actuating winding 51' of its own associated lockout relay LO2. This circuit may be followed from positive control power (+) through the coil 51', the contact 50' of the lockout relay LO2, and the cam contact 31 of the reclosing relay RC2, and the interlock switch 29' of the breaker CB2 to negative control power (−). When the lockout relay LO2 is picked up and latched in, it closes its contact 66' thereby to complete an energizing circuit for the trip coil 13 of the tie circuit breaker CBT. This circuit may be followed from positive control power (+) through the contact 66', the interlock contact 61 on the tie circuit breaker CBT, and the trip coil 13 of the tie circuit breaker to negative control power (−).

Thus when a persistent fault occurs upon the load circuit fed directly through the line circuit breaker CB2, the circuit breaker CB2 is locked out, the tie circuit breaker CBT is opened only upon lockout of the line circuit breaker, and the other line circuit breaker CB1 (assumed to be temporarily out of service) is not locked out. Accordingly, if voltage returns to the supply transformer 1, the line circuit breaker CB1 will be automatically reclosed, restoring service to the unfaulted load circuit 6.

In the foregoing description of "automatic" operation, various conditions have been assumed to illustrate the operation when the line circuit breaker CB1 is out of service and the load circuit 6 supplied through the tie circuit breaker CBT. It will now be entirely evident to those skilled in the art that the operation is similar in all respects if the line circuit breaker CB2 were out of service and the load circuit 7 fed through the tie circuit breaker CB2. Further detailed description of operation under these conditions is regarded as unnecessary. Such operation will be readily apparent from the drawing, wherein all parts of control and switching components associated with the line circuit breaker CB2 and not heretofore specifically referred to have been given primed reference numerals corresponding to like components associated with the circuit breaker CB1.

*Manual operation*

If the manual transfer switch MT is moved to its "hand" position, as by moving the handle 36 from the position A to the position H shown by dotted line, the apparatus is rendered unable to perform the automatic transfer and selective lockout operations described above. In this position of the transfer switch, the tie circuit breaker CBT can be closed only manually, and the reclosing relays RC1 and RC2 and undervoltage relays VR1 and VR2 are rendered inoperable to control their respective line circuit breakers. The overcurrent tripping means for each line circuit breaker are individually effective to trip their respective breakers, but the line circuit breakers can be closed only manually.

Specifically, it will be observed that when the manual transfer switch MT is moved to the "hand" position, it opens its contacts 70, 70' each in the automatic reclosing circuit of one of the line circuit breaker closing coils 8, 9, and closes a pair of contacts 71, 71' to provide individual line circuit breaker closing coil circuits each including a manual control switch 72, 72'. Similarly, the automatic closing coil circuit of the tie circuit breaker 10 is interrupted at the contact 57, and a contact 73 is closed to provide a manual closing circuit for the tie circuit breaker including a control switch 74. Also, the switch MT opens its contact 55 to render the undervoltage relays VR1 and VR2 ineffective to trip their associated circuit breakers CB1 and CB2.

With the apparatus in the "hand" position, it will now be observed that either line circuit breaker CB1 or CB2 may be tripped by its associated overcurrent relay OC1 or OC2. If either line circuit breaker is tripped by its overcurrent relay, opening of the circuit breaker initiates operation of its associated reclosing relay, but the reclosing relay is ineffective to effect reclosure because the automatic reclosing circuit to its line circuit breaker closing coil is interrupted at the manual transfer switch contact 70 or 70' as the case may be. Therefore, any reclosing relay thus set in operation proceeds to its lockout position and comes to rest. The line circuit breakers may be reclosed only by closure of the associated manual control switches 72, 72'. It will be appreciated, of course, that if desired, either of the line circuit breakers may be manually tripped through a similar manual control switch (not shown), or by direct actuation of the tripping latches.

If in "hand" operation of the system one of the line circuit breakers, for example CB1, is manually tripped and the tie circuit breaker CBT manually closed to feed the load circuit 6, any overload appearing upon the load circuit (6) fed through the tie circuit breaker trips the tie circuit breaker but not the then-common line circuit breaker, while any overload appearing upon the load circuit directly associated with the then-common line circuit breaker trips that breaker and isolates both lines.

Assuming that the system is in "hand" operation and that the circuit breaker CB1 is open, the tie breaker CBT closed, overload appearing upon the load circuit 6 energizes the overcurrent relay OC1. When the overcurrent relay OC1 picks up, it completes an energizing circuit for the selector relay actuating coil 35 in series circuit relation with a resistor 79. This circuit may be followed from positive control power (+) through the contact 40 of the overcurrent relay OC1, an interlock contact 75 of the line circuit breaker CB2, a contact 76 of the manual transfer switch MT, an interlock contact 64 of the tie circuit breaker CBT, the selector relay coil 35, a contact 78 of the manual transfer switch MT, and the resistor 79 to negative control power (−). Thus the trip coil 12 of the line circuit breaker CB2 is not energized as in "automatic" operation, the resistor 79 being now substituted in the series trip circuit for the coil 12 by the operation of the switches 65 and 78. However, the selector relay S is energized, and when this relay picks up, it closes a contact 80 to complete an energizing circuit for the trip coil 13 of the tie circuit breaker CBT. This circuit may be followed from positive control power (+) through a contact 81 of the manual transfer switch MT, the contact 80 of the selector relays, the interlock contact 61 of the tie circuit breaker, and the tie circuit breaker trip coil 13 to negative power (—).

If, while the line circuit breaker CB1 is open and the tie circuit breaker CBT closed in "hand" operation, an overload should occur on the load circuit 7, the line circuit breaker CB2 is tripped directly by action of the overload relay OC2, but the selector relay S is not energized since an interlock contact 75' of the line circuit breaker CB1 is at that time open.

It will, of course, be understood that an entirely similar operation takes place if in "hand" operation the line circuit breaker CB2 rather than the circuit breaker CB1 is cut of service, with the load circuit 7 being fed through the tie circuit breaker CBT. In this case, the overcurrent relay OC2 picks up the selector relay S through a circuit including an interlock contact 77 on the tie circuit breaker, as will be evident from the drawing.

It will now be understood by those skilled in the art that by our new and improved selective lockout control system for a pair of load circuits adapted to be interconnected by a tie circuit breaker, continuity of service is further enhanced by permitting a directly fed load circuit to remain in service if a persistent fault causing tripping of the line circuit breaker is on that load circuit being fed through the tie circuit breaker. By utilizing the reclosing relays to open the tie circuit breaker at a time prior to the last reclosure in any complete series of reclosures, this continuity of service is accomplished without the expense of providing the tie circuit breaker with its own overcurrent and reclosing relays.

While we have described a preferred embodiment of our invention by illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. In an electric current distribution system, a pair of line circuit breakers each having line terminals for connection to a source of electric current supply and load terminals for connection to an individual load circuit, a normally open tie circuit breaker interconnecting the load terminals of the said pair of line circuit breakers, means responsive to an abnormal condition other than overload in either said load circuit for opening the associated line circuit breaker and closing said tie circuit breaker, means operable when said tie circuit breaker is closed for opening the common line circuit breaker remaining closed in response to overload in either said load circuit, time element means operable upon overload opening of said common line circuit breaker to effect a predetermined series of recurrent reclosures thereof if said overload persists, and selector means responsive to persistent overload in the load circuit fed through said tie circuit breaker for opening said tie circuit breaker prior to the last reclosure of said common line circuit breaker in any complete series of reclosures.

2. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, means responsive to an abnormal condition other than overload in either said load circuit for opening the associated line circuit breaker and closing said tie circuit breaker, means operable when said tie circuit breaker is closed for opening the common line circuit breaker remaining closed in response to overload in either said load circuit, time element means operable upon overload opening of said common line circuit breaker to effect a predetermined series of recurrent reclosures thereof if said overload persists, and selector means controlled by said time element means and operable whenever said overload is on the load circuit fed through said tie circuit breaker for opening said tie circuit breaker prior to the last reclosure of said common line circuit breaker in any complete series of reclosures, and substantially simultaneously precluding automatic closing of the other line circuit breaker.

3. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, means responsive to an abnormal condition other than overload in either said load circuit for opening the associated line circuit breaker and closing said tie circuit breaker, means operable when said tie circuit breaker is closed for opening the common line circuit breaker remaining closed in response to overload in either said load circuit, time element means operable upon overload opening of said common line circuit breaker to effect a predetermined series of recurrent reclosures thereof if said overload persists, and means responsive to such persistent overload on the circuit fed through said common line circuit breaker only for opening both said common line circuit and said tie circuit breaker after the last reclosure of said line circuit breaker in any complete series of reclosures.

4. In an electric current distribution system, a pair of line circuit breakers each having line terminals for connection to a source of electric current supply and load terminals for connection to an individual load circuit, a normally open tie circuit breaker interconnecting the load terminals of the said pair of line circuit breakers, means responsive to an abnormal condition other than overload in either said load circuit for opening the associated line circuit breaker and closing said tie circuit breaker, means operable when said tie circuit breaker is closed for opening the common line circuit breaker remaining closed in response to overload in either said load circuit, time element means operable upon overload opening of said common line circuit breaker to effect a predetermined series of recurrent reclosures thereof if said overload persists, means responsive to such persistent overload on the load circuit fed through said common line circuit breaker only for opening both said common line circuit breaker and said tie circuit breaker after the last reclosure of said line circuit breaker in any complete series of reclosures, and selector means responsive to such persistent overload in the load circuit fed through said tie circuit breaker for opening said tie circuit breaker prior to the last reclosure of said common line circuit breaker in any said complete series of reclosures.

5. In an electric current distribution system, a pair of line circuit breakers each having line terminals for connection to a source of electric current supply and load terminals for connection to an individual load circuit, a normally open tie circuit breaker interconnecting the load terminals of the said pair of line circuit breakers, means responsive to an abnormal condition other than overload in either said load circuit for opening the associated line circuit breaker and closing said tie circuit breaker, means operable when said tie circuit breaker is closed for opening the common line circuit breaker remaining closed in response to overload in either said load circuit, time element means operable upon overload opening of said common line circuit breaker to effect a predetermined series of recurrent reclosures thereof if said overload persists, selector means responsive to persistent overload in the load circuit fed through said tie circuit breaker for opening said tie circuit breaker prior to the last reclosure of said common line circuit breaker in any complete series of reclosures and substantially simultaneously precluding closure of the other said line circuit breaker, and means responsive to persistent overload in the other load circuit for opening both said common line circuit breaker and said tie circuit breaker following such last reclosure.

6. In an electric current distribution system, a pair of line circuit breakers each having line terminals for connection to a source of electric current supply and load terminals for connection to an individual load circuit, a normally open tie circuit breaker interconnecting the load terminals of the said pair of line circuit breakers, voltage responsive means for opening each said line circuit breaker and substantially simultaneously closing said tie circuit breaker upon loss of voltage at its line terminals and effecting a reverse operation upon return of voltage, individual overload responsive means for opening each said line circuit breaker in response to excessive current in the associated load circuit, reclosing means for each said line circuit breaker operable upon overload opening thereof to initiate a series of a predetermined plural number of recurrent reclosures thereof if the overload persists, means operable upon closure of said tie circuit breaker to render both said overload responsive means operable to control the common line circuit breaker remaining closed, and means selectively controlled by said reclosing means and operable whenever said tie circuit breaker is closed for opening said tie circuit breaker prior to a last line circuit breaker reclosure in any complete series of reclosures resulting from persistent overload on the circuit fed through said tie circuit breaker.

7. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, individual undervoltage responsive means for opening each said line circuit breaker and substantially simultaneously closing said tie circuit breaker upon loss of voltage at its line terminals and effecting a reverse operation upon return of voltage, individual overload responsive means for opening each said line circuit breaker in response to excessive current in the associated load circuit, reclosing means for each said line circuit breaker operable upon overload opening thereof to initiate a series of predetermined plural number of recurrent reclosures thereof if the overload persists, means operable upon closure of said tie circuit breaker to render both said overload responsive means operable to control the common line circuit breaker remaining closed, and selector means controlled by said reclosing means and operable whenever said tie circuit breaker is closed for opening said tie circuit breaker and rendering its associated undervoltage responsive means ineffective to close the other said line circuit breaker, said selector means being operable prior to a last line circuit breaker reclosure in any complete series of reclosures resulting from a persistent overload on the load circuit fed through said tie circuit breaker.

8. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, individual undervoltage responsive means for opening each said line circuit breaker and substantially simultaneously closing said tie circuit breaker upon loss of voltage at its line terminals and effecting a reverse operation upon return of voltage, individual overload responsive means for opening each said line circuit breaker in response to excessive current in the associated load circuit, reclosing means for each said line circuit breaker operable upon overload opening thereof to initiate a series of predetermined plural number of recurrent reclosures thereof if the overload persists, means operable upon closure of said tie circuit breaker to render both said overload responsive means operable to control the common line circuit breaker remaining closed, and means selectively controlled by said reclosing means and operable whenever said tie circuit breaker is closed for opening said tie circuit breaker and said common line circuit breaker following the last line circuit breaker reclosure in any complete series resulting from a persistent overload on the load circuit fed through the common line circuit breaker only.

9. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, individual undervoltage responsive means for opening each said line circuit breaker and substantially simultaneously closing said tie circuit breaker upon loss of voltage at the line terminals of any line circuit breaker and effecting a reverse operation upon return of voltage, individual overload responsive means for opening each said line circuit breaker in response to excessive current in the associated load circuit, cycle timing means associated with each said line circuit breaker and operable in response to overload opening thereof to initiate a series of a predetermined number of recurrent reclosures thereof if said overload persists, interlock means controlled by said tie circuit breaker for rendering both said overload responsive means operable to control the common line circuit breaker remaining closed when said tie circuit breaker is closed, individual lockout means for rendering each said cycle timing means ineffective to reclose its associated line circuit breaker, means actuated by either said lockout means to open said tie circuit breaker when closed, a selector relay actuated by said overload responsive means in response to overload on a load circuit fed through said tie circuit breaker, and switching means actuated by each said cycle timing means and selectively controlled by said selector relay to actuate the lockout means associated with the other said line circuit breaker prior to the last reclosure of any common line circuit breaker in any complete reclosing series resulting from persistent overload on the load circuit fed through said tie circuit breaker.

10. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, individual undervoltage responsive means for opening each said line circuit breaker and substantially simultaneously closing said tie circuit breaker upon loss of voltage at the line terminals of any line circuit breaker and effecting a reverse operation upon return of voltage, individual overload responsive means for opening each said line circuit breaker in response to excessive current in the associated load circuit, cycle timing means associated with each said line circuit breaker and operable in response to overload opening thereof to initiate a series of a predetermined number of recurrent reclosures thereof if said overload persists, interlock means controlled by said tie circuit breaker for rendering both said overload responsive means operable to control the common line circuit breaker remaining closed when said tie circuit breaker is closed, individual lockout means for rendering each said cycle timing ineffective to reclose its associated line circuit breaker, means actuated by either said lockout means to open said tie circuit breaker when closed, a selector relay actuated by said overload responsive means in response to overload on a load circuit fed through said tie circuit breaker, switching means actuated by each said cycle timing means and selectively controlled by said selector relay to actuate the lockout means associated with the other said line circuit breaker prior to the last reclosure of any common line circuit breaker in any complete reclosing series resulting from persistent overload on the load circuit fed through said tie circuit breaker, and second switching means actuated by each said cycle timing means to actuate the lockout means associated therewith after the last reclosure in any common line circuit breaker in any complete reclosing series resulting from persistent overload on the load circuit fed directly therethrough.

11. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, voltage responsive means associated with each said line circuit breaker for opening said line circuit breaker and closing said tie circuit breaker, individual overload responsive means for opening each said line circuit breaker in response to excessive current in the load circuit fed directly therethrough, reclosing means associated with each said line circuit breaker and operable in response to overload opening thereof to reclose said line circuit breaker a predetermined plural number of times if said overload persists, and manual switching means having a hand position in which said reclosing means and voltage responsive closing means for said tie circuit breaker are disabled and each said overload responsive means connected to open both said tie circuit breaker and its associated line circuit breaker and having an automatic position in which each said overload responsive means is connected to open both said line circuit breakers, one said line circuit breaker normally being open and the other common to said load circuits when said tie circuit breaker is closed.

12. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, individual voltage responsive means for opening each said line circuit breaker and closing said tie circuit breaker, individual overload responsive means operable when the associated line circuit breaker is closed to open said line circuit breaker in response to excessive current on the load circuit fed directly therethrough, reclosing means associated with each said line circuit breaker and operable in response to overload opening thereof to reclose said line circuit breaker a predetermined plural number of times if said overload persists, manually operable switching means having a hand position in which said reclosing means and voltage responsive closing means for said tie circuit breaker are disabled and each said overload responsive means connected to open both said tie circuit breaker and its associated line circuit breaker and having an automatic position in which each said overload responsive means is connected to open both said line circuit breaker, one said line circuit breaker normally being open and the other common to said load circuits when said tie circuit breaker is closed, and selector means operable in the automatic position of said manual switching means to render the reclosing means associated with any common line circuit breaker effective to open said tie circuit breaker prior to the last reclosure of said common line circuit breaker in complete series of reclosures resulting from persistent overload on the load circuit fed through said tie circuit breaker.

13. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, means for closing said tie circuit breaker and opening either said line circuit breaker to connect said load circuits in parallel circuit relation to a single common line circuit breaker, one said load circuit being then fed through said tie breaker, individual overload responsive means associated with each said load circuit to open the line circuit breaker directly associated therewith, and selector means operable when said tie circuit breaker is closed and one said line circuit breaker common to said load circuits for opening only said tie circuit breaker in response to overload on the load circuit fed through said tie circuit breaker.

14. In an electric current distribution system, a pair of line circuit breakers each having line terminals for connection to a source of electric current supply and load terminals for connection to an individual load circuit, a normally open tie circuit breaker interconnecting the load terminals of said pair of line circuit breakers, means for closing said tie circuit breaker and opening either said line circuit breaker to connect said load circuits in parallel circuit relation to a single common line circuit breaker, one said load circuit being then fed through said tie circuit breaker, individual overload responsive means associated with each said load circuit to open the line circuit breaker directly associated therewith, relay means for opening said tie circuit breaker, and switching means controlled by each said line circuit breakers when closed for connecting the overload responsive means of the other line circuit breaker to actuate the relay means.

No references cited.